United States Patent
Kamezaki et al.

[11] Patent Number: 5,904,969
[45] Date of Patent: May 18, 1999

[54] OPTICAL DATA RECORDING MEDIUM AND MANUFACTURING METHOD THEREOF

[75] Inventors: Hisamitsu Kamezaki, Yuuki-gun; Yoshiaki Minagawa; Kazuya Fukunaga, both of Kitasouma-gun, all of Japan

[73] Assignee: Hitachi Maxell, Ltd., Osaka, Japan

[21] Appl. No.: 08/677,583

[22] Filed: Jul. 5, 1996

[30]     Foreign Application Priority Data

Jul. 7, 1995   [JP]   Japan ................................. 7-172365

[51] Int. Cl.⁶ ........................................................ B32B 3/00
[52] U.S. Cl. ........................ 428/64.1; 428/64.4; 428/64.8; 428/913; 430/270.14; 430/495.1; 430/945; 369/275.4; 369/283; 369/288
[58] Field of Search ........................... 428/64.1, 64.2, 428/64.8, 913, 64.4; 430/270.14, 495.1, 945; 369/275.1, 275.4, 283, 288

[56]           References Cited

U.S. PATENT DOCUMENTS

| | | | |
|---|---|---|---|
| 5,009,818 | 4/1991 | Arai et al. ............................ | 264/1.003 |
| 5,021,276 | 6/1991 | Kamezaki et al. ..................... | 428/64.1 |
| 5,353,277 | 10/1994 | Yasuda et al. ........................ | 369/275.4 |
| 5,591,501 | 1/1997 | Ovshinsky et al. .................... | 428/64.1 |

FOREIGN PATENT DOCUMENTS

| | | |
|---|---|---|
| 0354601 | 2/1990 | European Pat. Off. . |
| 0549488 | 6/1993 | European Pat. Off. . |
| 2289935 | 6/1989 | Japan . |

*Primary Examiner*—Elizabeth Evans
*Attorney, Agent, or Firm*—Birch, Stewart, Kolasch & Birch, LLP

[57]              ABSTRACT

A desired writable optical data recording medium has a transparent substrate 1 where a side wall of a recess is connected to a land surface by a curved surface. A data recording portion of a dye material may be placed only in recesses of a pre-formatted pattern on a transparent substrate, and a reflective layer may be formed on the data recording portion and on the exposed land area between neighboring recesses. The medium can show reflectivity of not less than 65% on reproduction and reduce the cost for manufacturing thereof.

20 Claims, 7 Drawing Sheets

OPTICAL DATA RECORDING MEDIUM AND MANUFACTURING METHOD THEREOF

BACKGROUND OF THE INVENTION

1. Field of the Invention

The present invention relates to a writable optical data recording medium comprising a data recording layer composed of a dye material, and a manufacturing method therefor.

2. Description of the Related Art

A writable optical data recording medium which has a data recording layer composed of a water-insoluble organic dye material and which produces an output signal conforming to the CD format in reproduction of its recorded data has been known. This type of recording medium is called as WO(write once) type CD (Compact Disk) and is disclosed in, for example, Japanese Laid-Open No.2-289,935 and U.S. Pat. No. 5,021,276. This WO type CD has a structure in which a data recording layer composed of a dye material, a metal reflective layer, and a protective layer of a UV curing type resin are successively formed on a surface having a pre-formatted pattern of a transparent substrate. In recording, a laser beam is irradiated through the transparent substrate to the recording layer to heat the dye material by virtue of the absorption of the laser light. The heat decomposes the dye material to change the optical property of the data recording layer, and causes deformation of the transparent substrate placed under the data recording layer. When the recorded data is reproduced, a low-powered laser beam, unaffecting the data recording layer, is irradiated to the recorded area along the tracks, and then a difference between intensities of the reflected lights from the recorded portion and unrecorded portion is detected.

In accordance with the CD Standard, the WO type CD has to have 65% or more reflectivity with a laser beam for reproduction to be able to reproduce the data by an available CD players. In order to satisfy such a standard, the above-mentioned WO type CD uses gold metal for the metal reflective layer material. However, it goes without saying that the use of gold or silver metal as a reflective layer material increases the manufacturing cost of the WO type CD and its price accordingly.

In order to reduce the cost for manufacturing the WO type CDs, a WO type CD using aluminum for its metal reflective layer material has been proposed, for example, as described in Television Journal Vol.48(1994), No.5, pp 584–590.

The WO type CD using aluminum for its metal reflective layer material intends to seemingly heighten the reflectivity of the WO type CD by forming a light interference layer on the incident side of a recording or reproduction beam to cause multi-interference of the incident light. Accordingly, the WO type CD has a light interference layer as an essential part. However, since the light interference layer is formed by a process of sputtering an inorganic dielectric material, the process increases the total cost for manufacturing the WO type CD.

SUMMARY OF THE INVENTION

The object of the present invention is to overcome the inconvenience of the conventional arts and to provide a WO type CD with an high productivity, which has a reflective layer composed by a less expensive material such as aluminum material and which shows reflectivity of not less than 65% in conformity with CD standard.

In accordance with the first aspect of the invention, an optical data recording medium is provided, which comprises:

a transparent substrate on one surface of which recesses and lands are formed as pre-formatted pattern, a portion connecting a side wall of a recess with a land surface defined by the recess being formed as a curved surface;

a data recording layer comprised of a dye material and formed on the one surface of the transparent substrate and;

a reflective layer comprised of a material having a lower reflectivity than silver and formed on the data recording layer.

In the conventional arts, it has been desirable that the recesses like pits and grooves, which constitute the pre-formatted pattern, are formed on the substitute with a sharp outline in order to make clear a contrast between the recesses and land areas defined by the recesses. Namely, a boundary (connecting portion) between a side wall of the recess and the land surface of the transparent substrate has been formed as sharp edge of the land. However, the depth of the recesses is generally controlled such that a reflected light from the bottom of the recess interferes a reflected light from the land surface to decrease the light amount of the reflected light from the bottom. When the boundary is formed as the sharp edge, the interference between the light reflected from the bottom of the recess and the light reflected from the edge of the land becomes large so as to weaken the reflected light from the bottom. Due to the interference of the lights, it becomes difficult to maintain the reflectivity of 65% or more specified in the CD Standard. On the other hand, when the boundary between the side wall of the recess and the land surface is formed as a curved surface (see FIG. 7), the interference between the light from the bottom of the recess and the light from the land portion decreases, and, as a result, a total amount of the light reflected from the pre-formatted area increases. Accordingly, the necessary reflectivity under the CD standard can be achieved.

In order to manufacture the optical data recording medium of the first aspect of the invention, a method for manufacturing an optical data recording medium is provided which comprises the steps of:

applying a photoresist on a surface of an original disk;

exposing the photoresist to a laser beam in accordance with a pre-formatted pattern;

developing the original disk to form recesses and lands in the photoresist layer of the original disk in accordance with the pre-formatted pattern;

heating the developed original disk over the glass transition temperature of the photoresist layer to deform the pre-formatted;

making a stamper having a reversed pre-formatted pattern transferred from the developed original disk;

injecting a resin into a molding die fitted with the stamper to make a substrate on one surface of which recesses and lands are formed in accordance with the pre-formatted pattern, a portion connecting a side wall of a recess with a land defined by the recess being formed as a curved surface;

forming a data recording layer on the one surface of the substrate and;

forming a reflective layer on the data recording layer.

In accordance with the second aspect of the invention, in order to overcome the above-mentioned inconvenience of the conventional arts in a different way, an optical data recording medium is provided, which comprises:

a transparent substrate on one surface of which recesses and lands are formed as pre-formatted pattern, a portion connecting a side wall of a recess with a land surface defined by the recess being projected from the land surface in a direction of the thickness of the transparent substrate;

a data recording layer comprised of a dye material and formed on the one surface of the transparent substrate and;

a reflective layer comprised of a material having a lower reflectivity than silver and formed on the data recording layer.

When the edge portion connecting the side wall of the recess with the land surface is shaped so as to project from the land surface in a direction of the thickness, the interference light from the edge decreases, and, as a result, a total amount of the light reflected from the pre-formatted area increases. Accordingly, the necessary reflectivity under the CD standard can be achieved.

In order to manufacture the optical data recording medium of the second aspect of the invention, a method for manufacturing an optical data recording medium is provided comprises the steps of:

applying a photoresist on a surface of an original disk;

exposing the photoresist to a laser beam in accordance with a pre-formatted pattern;

developing the original disk to form recesses and lands in the photoresist layer in accordance with the pre-formatted pattern;

making a stamper having a reversed pre-formatted pattern transferred from the developed original disk;

injecting a resin into a molding die fitted with the stamper and removing the resin in the shape of a substrate from the stamper prior to complete solidification of the resin, thereby obtaining a substrate on one surface of which recesses and lands are formed in accordance with the pre-formatted pattern, a portion connecting a side wall of a recess with a land defined by the recess being projected from the land surface in a direction of thickness of the substrate;

forming a data recording layer on the one surface of the substrate and;

forming a reflective layer on the data recording layer.

In the above-mentioned optical data recording media, it is desirable that the ratio b/a of the width b of the land surface defined between neighboring recesses to the space a between the bottoms of neighboring recesses is not more that 0.9. By controlling the ratio b/a to not more than 0.9, interference between a light reflected from the bottom of the recess and a light reflected from the land portion can be reduced effectively. As a result, a reflectivity with the laser beam for reproduction increases.

In accordance with the third aspect of the invention, in order to overcome the above-mentioned inconvenience of the conventional arts in a different way, an optical data recording medium is provided, which comprises:

a transparent substrate on one surface of which recesses and lands are formed as pre-formatted pattern;

a reflective layer comprised of a material having a lower reflectivity than silver and formed on the one suffice of the transparent substrate;

a data recording portion comprising a dye material, which is formed only in the recesses of the transparent substrate.

Since a pure aluminum film formed by sputtering or vapor deposition has a reflectivity of more than 86% with the light having a wavelength of 770 to 830 nm, a reflectivity of more than 65% conforming to the CD Standard may be achieved when an aluminum reflective layer is directly formed on the transparent substrate for manufacturing a CD. However, in case of the conventional WO type CD, as above described, where a data recording layer composed of a dye material is formed between the transparent substrate and the aluminum reflective layer, the incident light for reproduction from the side of the transparent substrate is absorbed by the dye material of the data recording layer. As a result, the amount of the light arriving at the aluminum reflective layer and the amount of the reflected light directed to detector through the data recording layer are reduced. Thus, the reflectivity with the laser light for reproduction decreases so that the reflectivity of more than 65% conforming to the CD Standard cannot be obtained.

According to the third aspect of the invention, a dye material is filled only in the recesses like pits and grooves of pre-formatted pattern, but any dye layer is not substantially formed on the land area defined between the recesses. An aluminum reflective layer is formed on the surface of the dye material filled in the recesses of the pre-formatted pattern and the land area. Since the a part of the light for reproduction need not pass through the dye material to arrive at the reflective layer and directs to the detector, the light amount detected by the detector increases compared with the conventional WO type CD. Specifically, in reproduction of a signal, the spot of laser beam for reproduction having a diameter of about three times of the width of the groove is irradiated along the track of the WO type CD. Therefore, the amount of light arriving at the aluminum reflective layer increases and then the reflectivity increases in the WO type CD of the invention because the outside portion of the laser beam for reproduction is directly projected on the aluminum reflective layer when the center of the laser beam spot is set at the middle of the groove, or because the central portion of the laser beam for reproduction is directly projected on the aluminum reflective layer when the center of the laser beam for reproduction is set on the land area between the neighboring groove of the pre-formatted pattern. Accordingly, a WO type optical data recording medium having the reflectivity of more than 65% conforming to the CD Standard can be produced.

In order to manufacture the optical data recording medium of the third aspect of the invention, a method for manufacturing an optical data recording medium is provided which comprises preparing a transparent substrate on one surface of which recesses and lands are formed as a pre-formatted pattern; placing a dye material only in the recesses of the transparent substrate; and forming a reflective layer on the dye material filled in the recesses and the lands of the transparent substrate.

In the optical data recording medium according to the invention, it is preferred that the material of the reflective layer is one material selected from a group consisting of aluminum, copper and a polymer material produced by association of a di-carbocyanine dye dispersed vinyl resin solution.

DETAILED DESCRIPTION OF THE PREFERRED EMBODIMENT

Figure 1:
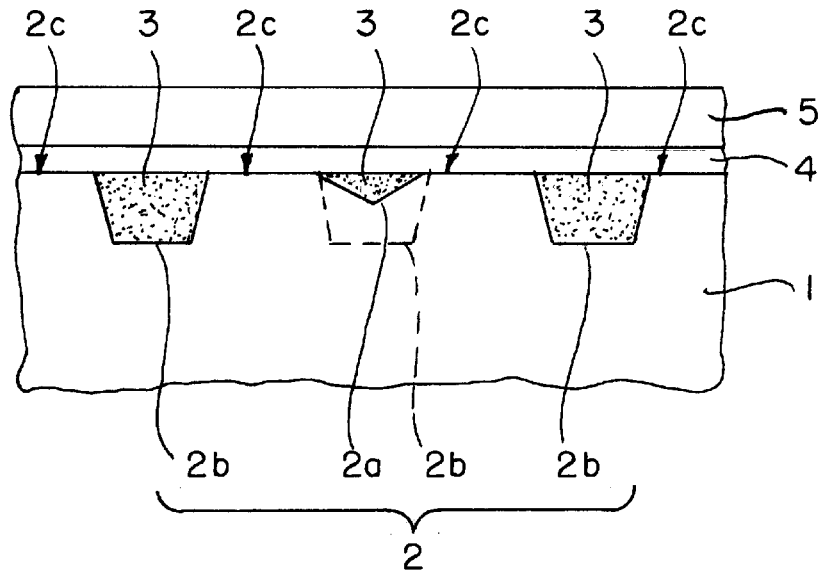
FIG. 1 is an enlarged cross sectional view of a main part of an optical data recording medium of the first embodiment according to the present invention.
Figure 2:
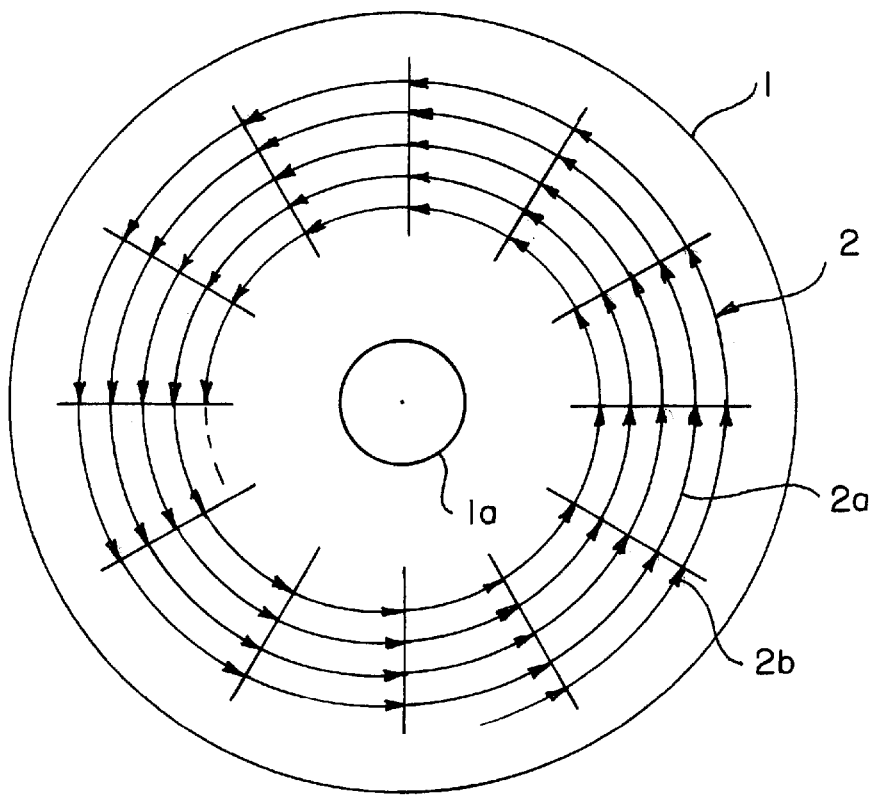
FIG. 2 is a top view of an optical data recording medium of the first embodiment according to the present invention.

The preferred embodiments of the present invention will be described below in detail with reference to the drawings.
First Embodiment An optical data recording medium of the first embodiment will be described based on FIG. 1 and FIG. 2. FIG. 1 is an enlarged cross sectional view of a main part of an optical data recording medium of the first embodiment and FIG. 2 is a top view of the optical data recording medium of the first embodiment. As shown in these drawings, the optical data recording medium of the first embodiment is composed of a transparent substrate 1 on one surface of which a pre-formatted pattern 2 is formed as a fine irregular surface, a data recording portion 3 filled with a dye material in the pre-formatted pattern 2, a reflective layer 4 laid on the data recording portion 3 and the exposed surface (land surface) of the transparent substrate 1 between the data recording portions 3, and a protective layer 5 coated on the reflective layer.

As the transparent substrate 1, any types of the known transparent substrates can be used for the present invention. For example, a transparent substrate having a desired pre-formatted pattern by an injection molding of a transparent resin material such as polycarbonate, polymethyl methacrylate, polymethyl pentene, and epoxy resin. And, a transparent substrate formed by adhering a transparent resin film with a transferred desired pre-formatted pattern to a transparent ceramic disk such as a glass plate and the like can be used. A transparent substrate 1 which a disk-like optical data recording medium (hereinafter, referred to as an optical disk) is composed of, is formed as a disk having a central hole 1a in its central portion as shown in FIG. 2. Further, the method for manufacturing the transparent substrate 1 belongs to the conventional arts and does not constitute the essential points in the present invention, and the explanation thereof has been omitted.

The pre-formatted pattern 2 includes a beam guiding groove which allows laser beam for recording and reproducing to follow the recording tracks. In the example shown in FIG. 1 and FIG. 2, the beam guiding groove 2a is spirally or concentrially formed with a common center. A pre-pits 2b including address pits, clock pits, and the like are formed along the guide groove 2a. When the pre-pit 2b is formed on the same track as the guide groove 2a, the guide groove 2a and the pre-pit 2b having their own depths different from each other are formed in order to optically distinguish two of them. When the pre-pit is formed between the neighboring guide grooves 2a, both of the guide groove and the pre-pit having the same depth can be formed. Further, a wabbling pit, instead of the guide groove 2a, may be formed along the recorded tracks for a beam guiding portion.

The data recording portion 3 can be formed by filling a dye material changing absorbed light energy into heat energy, or a heat-mode recording material at least partially containing the dye material into the above-mentioned pre-formatted pattern 2.

The dye material usable for the data recording portion 3 includes, for example, a polymethyne dye, an anthraquinone dye, a cyanine dye, a phthalocyanine dye, a naphthalocyanine dye, a xanthene dye, an tryphenyl methane dye, a pyrylium dye, an azulene dye, a metal-containing azo dye and the like. The dye materials disclosed in U.S. Pat. No. 4,996,089 may be used. A content of U.S. Pat. No. 4,996,089 is incorporated herein by reference. Among these, a dicarbocyanine derivative, a phthalocyanine derivative, naphthalocyanine derivative and a cyanine derivative may be particularly preferably used. Further, a dye material with various quenchers added, such as an aminium dye, the like may be also used. Furthermore, a resin in which one or more dye materials selected from a group of above-mentioned dye materials have been dispersed may be also used as a material for forming the data recording portion 3. The resin material in which dye materials can be dispersed includes acrylic resin, vinyl resin, phenolic resin, fluoropolymer, silicone resin, polyamine resin, cellulose resin and the like.

Figure 9:
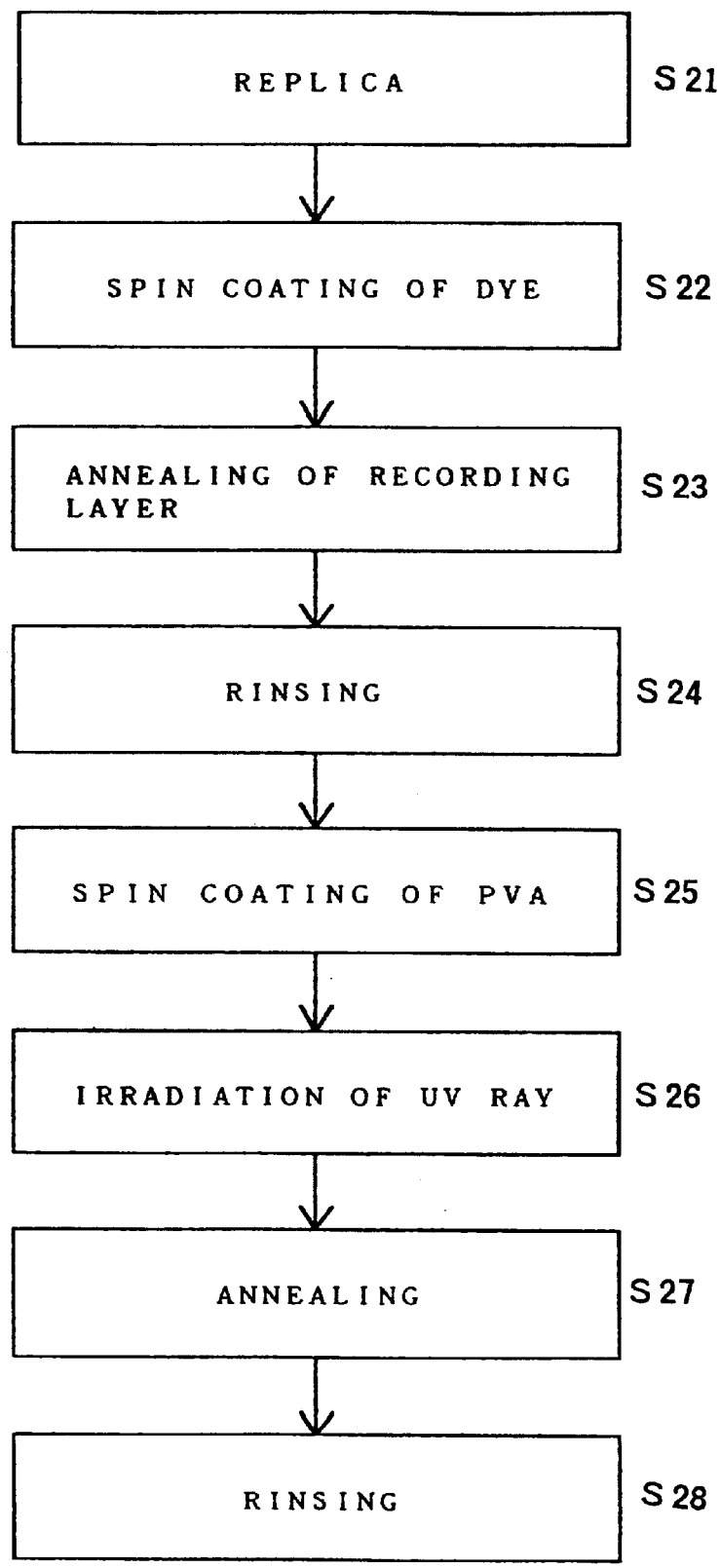
FIG. 9 is a flowchart showing the processes for forming the recording layer in an optical data recording medium of the first embodiment according to the present invention.

The method for forming the data recording portion will be explained by using FIG. 9. FIG. 9 shows a flowchart of the process for forming the data recording portion and an intermediate layer, which will be described later, on the transparent substitute. In FIG. 9, the steps S21–S24 can be used for forming the data recording portion. In the first step (S21), the transparent substrate with a pre-formatted pattern (REPRICA) are obtained by an injection molding technique. In the second step (S22), a solution of dye material selected among the group of dye materials listed above, for example an ethylcellosolve solution of a phthalocyanine dye, has been spin-coated on the surface having a pre-formatted-pattern of the transparent substrate to fill the dye materials in the recesses of pre-formatted pattern 2. In order to effect the spin-coating, a spiner coating apparatus disclosed in U.S. Pat. No. 5,199,988 can be used. The content of U.S. Pat. No. 5,199,988 is incorporated herein by reference. Next, the transparent substrate is annealed at about 70 centigrade to evaporate the solvent such as ethylcellosolve from the coated dye material (S23). Then, the dye material on the land area 2c between the recesses (grooves 2a and pre-pits 2b shown in FIG. 1) are selectively removed to expose the surface of the transparent substrate (S24). A method of selectively removing the dye material stuck to the land area 2c is, after the solution of the dye material has been spin-coated on the surface of the transparent substrate, to spin-coat a solvent such as water, alcohol, cellosolve or the solvent used for the dye material solution on the surface of the formed dye layer, and to selectively remove the dye material stuck to the land area. As a result, the dye material is left only in the grooves 2a and pre-pits 2b of the pre-formatted pattern 2.

The reflective layer can be formed using organic materials having high reflectivity besides metal materials such as aluminum, silver, copper, and the like, or metal alloys containing the above-mentioned metal materials as their main components. One example of the reflective layer using organic materials is an associated material formed by spin-coating a di-carbocyanine dye dispersed vinyl resin solution on a transparent substrate 1 and heat-treatment (for example, at 80 centigrade for 3 hours) of the substrate 1. Among these reflective materials, aluminum is particularly suitable because it is low-cost and has the results of actual use in compact disks. When metals or metal alloy materials are used for a reflective layer, the reflective layer 4 can be formed by a method of making a film in vacuum such as sputtering, vacuum evaporation, and the like. In this case, a technique to enhance the reflectivity of those metal reflective layers by forming films having different densities by means of sputtering under a high degree of vacuum (for example, around $10^{-5}$ Torr) in the vacuum chamber can be used.

A protective layer 5 can be formed using inorganic materials such as light-curing resins and the like. An inorganic protective layer can be formed by a method of making films in vacuum, and an organic protective layer can be formed by applying ultraviolet light to a light-curing resin film spin-coated on the reflective layer 4.

The data recording medium according to the invention may be in the form of a disc, a card or a tape. The disc may be a single plate structure or a double side laminated structure where two plates are stacked each other by an adhesive. In the latter, for example, an external diameter of the disc is preferably 120±0.3 mm. A thickness in a clamp-ring area of the disc is preferably 1.14–1.50 mm. An weight of the disc is preferably in the range of 14 to 20 grams. An average track-pitch is preferably in the range of 0.74±0.04 μm.

Hereinafter, more concrete experimental examples belonging to the first embodiment are described to make effects of the present invention clear.

EXAMPLE 1-(1)

An acrylic resin containing 20 weight % of a phthalocyanine dye and 20 weight % of a cyanine respectively dispersed in the acrylic resin was used to form the data recording portion on a pre-formatted pattern of a polycarbonate substrate shown in FIGS. 1 and 2. Next, a di-carbocyanine dye dispersed vinyl resin solution was spin-coated on the surface having a pre-formatted pattern of the polycarbonate substrate. And then the substrate was heated at 80 centigrade for 3 hours to form an associated material as a reflective layer. Finally, a UV-curing resin as a protective layer was applied on the reflective layer to finish a product of an optical data recording medium.

The obtained optical data recording medium was loaded into a drive system (an analyzer for CD-R: PULSE TECH CORPORATION, DDU-1000: λ=780 nm) which conforms to the CD Standard. When test data (random EFM signals) were recorded on the data recording medium and reproduced therefrom by the drive system, excellent recording and reproducing characteristics were obtained. The reflectivity of the reproducing light measured not less than 65%.

Further, when a dye material containing 20 weight % of a phthalocyanine dye and a cyanine dye each dispersed in vinyl resin, phenolic resin, fluoro resin, silicone resin, polyamide resin, or cellulose resin instead of acrylic resin is used, the same effect was confirmed in the respective cases.

EXAMPLE 1-(2)

A data recording portion was formed using a dye material of acrylic resin containing 20 weight % of a naphthalocyanine dye and a cyanine dye each dispersed in the acrylic resin. Other conditions to produce an optical recording medium were the same as those in the experimental example 1-(1).

When the obtained optical recording medium of the present example was loaded into the drive system used in Example 1-(1) to record test data (random EFM signals) and reproduce it, excellent receding and reproducing characteristics were obtained. The reflectivity of the reproduction light from the medium measured not less than 65%.

EXAMPLE 1-(3)

A data recording portion was formed using a dye material of acrylic resin containing 20 weight % of a naphthalocyanine dye and a phthalocyanine dye each dispersed in the acrylic resin. Other condition for producing an optical recording medium were the same as those in the example 1-(1).

When the obtained optical recording medium of the present example was loaded into the drive system used in Example 1-(1) to record test data (random EFM signals) and reproduce it, excellent recording and reproducing characteristics were obtained. The reflectivity of the reproduction light from the medium measured not less than 65%.

EXAMPLE 1-(4)

Optical data recording media corresponding to the examples 1-(1) to 1-(3) were produced in the same way in these examples except an associated material made from a phthalocyanine dye dispersed vinyl resin solution was used as the reflective layer.

When the obtained optical recording medium of the present example was loaded into the drive system used in Example 1-(1) to record test data (random EFM signals) and reproduce it, excellent recording and reproducing characteristics were obtained. The reflectivity of the reproduction light from the medium measured not less than 65%.

EXAMPLE 1-(5)

A data recording portion was formed on a polycarbonate substrate having the pre-formatted pattern shown in FIGS. 1 and 2 using an ethylcellosolve solution of a cyanine dye having its main absorption in the region of wavelength of 650 nm to 750 nm. Next, a reflective layer was formed by sputtering aluminum on the surface having the pre-formatted pattern of the polycarbonate substrate. Finally, an optical data recording medium was completed by applying a protective layer of a UV-curing resin on the aluminum reflective layer.

When the obtained optical recording medium of the present example was loaded into the drive system used in Example 1-(1) to record test data (random EFM signals) and reproduce it, excellent recording and reproducing characteristics were obtained. The reflectivity of the reproduction light from the medium measured not less than 65%.

EXAMPLE 1-(6)

A data recording portion was formed using an ethylcellosolve solution of a phthalocyanine dye showing its main absorption in the region of wavelength of 650 nm to 750 nm. Other condition for producing an optical recording medium were the same as those in the example 1-(5).

When the obtained optical recording medium of the present example was loaded into the drive system used in Example 1-(1) to record test data (random EFM signals) and reproduce it, excellent recording and reproducing characteristics were obtained. The reflectivity of the reproduction light from the medium measured not less than 65%.

EXAMPLE 1-(7)

A data recording portion was formed using an ethylcellosolve solution of a mixture of a cyanine dye and a phthalocyanine dye showing its main absorption in the region of wavelength of 650 nm to 750 nm. Other conditions for producing an optical recording medium were the same as those in the example of 1-(5).

When the obtained optical recording medium of the present example was loaded into the drive system used in Example 1-(1) to record test data (random EFM signals) and reproduce it, excellent recording and reproducing characteristics were obtained. The reflectivity of the reproduction light from the medium measured not less than 65%.

EXAMPLE 1-(8)

A data recording portion was formed using an ethylcellosolve solution of a polymethyne dye showing its main absorption in the region of wavelength of 650 nm to 750 nm. Other conditions for producing an optical recording medium were the same as those in the example of 1-(5).

When the obtained optical recording medium of the present example was loaded into the drive system used in Example 1-(1) to record test data (random EFM signals) and reproduce it, excellent recording and reproducing characteristics were obtained. The reflectivity of the reproduction light from the medium measured not less than 65%.

EXAMPLE 1-(9)

A data recording portion was formed on using an ethylcellosolve solution of a polycarbonate substrate having the pre-formatted pattern shown in FIGS. 1 and 2 using a cyanine dye having its main absorption in the region of wavelength of 550 nm to 650 nm. Next, a reflective layer was formed by sputtering aluminum on the surface having the pre-formatted pattern of the polycarbonate substrate. Finally, an optical data recording medium was completed by applying a protective layer of a UV-curing resin on the aluminum reflective layer.

An optical recording medium of the present experimental example was loaded into a drive system using a laser beam of a wavelength of 650 nm as its recording and reproducing light. When a test data were recorded in the medium and reproduced therefrom, excellent recording and reproducing characteristics were obtained.

EXAMPLE 1-(10)

A data recording portion was formed using an ethylcellosolve solution of a phthalocyanine dye showing its main absorption in the region of wavelength of 550 nm to 650 nm. Other condition for producing an optical recording medium were the same as those in the example 1–5.

An optical recording medium of the present experimental example was loaded into a drive system having a 650 nm laser beam for recording and reproducing. When test data were recorded on the medium and reproduced therefrom, excellent recording and reproducing characteristics were obtained.

EXAMPLE 1-(11)

A data recording portion was formed using an ethylcellosolve solution of a cyanine dye and a phthalocyanine dye showing its main absorption in the region of wavelength of 550 nm to 650 nm. Other conditions for producing an optical recording medium were the same as those in the example of 1-(5).

An optical recording medium of the present experimental example was loaded into a drive system having a 650 nm laser beam for recording and reproducing. When test data were recorded on the medium and reproduced therefrom, excellent recording and reproducing characteristics were obtained.

EXAMPLE 1-(12)

A data recording portion was formed using an ethylcellosolve solution of a polymethyne dye showing its main absorption in the region of wavelength of 550 nm to 650 nm. Other conditions for producing an optical recording medium were the same as those in the example of 1-(5).

When an optical recording medium of the present experimental example was loaded into a drive system having a 650 nm laser beam for recording and reproducing. When test data were recorded on the medium and reproduced therefrom, excellent recording and reproducing characteristics were obtained.

Second Embodiment

Figure 3:
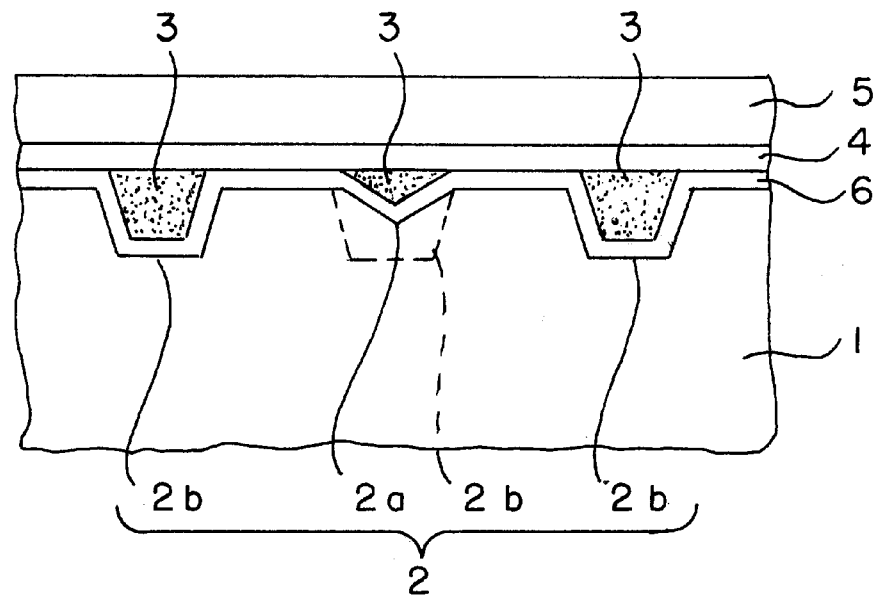
FIG. 3 is an enlarged cross sectional view of a main part of an optical data recording medium of the second embodiment according to the present invention.

An optical data recording medium of a second embodiment will be described based on FIG. 3. FIG. 3 is an enlarged cross sectional view of a main part of the optical data recording medium of the second embodiment. As shown in the drawing, the optical data recording medium is characterized by an undercoat layer 6 formed on the surface having a pre-formatted pattern of a transparent substrate 1. A data recording portion 3 was formed by filling a dye material in the grooves 2a and pre-pits 2b of the pre-formatted pattern 2 formed on the surface of the undercoat layer 6. A reflective layer was formed on the data recording portion 3 and on the exposed surface of the undercoat layer between neighboring data recording portions 3. A protective layer 5 was coated on the reflective layer 4.

The undercoat layer 6 is formed to improve the adhesion of the data recording portion 3 to the transparent substrate 1 and recording sensitivity, and to protect the data recording portion 3. The undercoat layer 6 is formed using the hydrophilic resins of, for example, polyvinyl alcohol, polyethylene oxide, polyacrylic acid, polystyrene-sodium-sulfonic acid, polyvinyl pyrolydone, polymethacrylic acid, polypropylene glycol, methyl cellulose, polyvinyl nitrate, and the like. The undercoat layer 6 is formed by spin-coating a water solution of hydrophilic resins on the surface having the pre-formatted pattern 2 of the transparent substrate 1.

The undercoat layer 6 is insufficient in water-proofing (moisture resistivity, moisture permeability) and heat resistivity because it is composed of the hydrophilic resin. Accordingly the undercoat layer 6 is desirable to improve its water-proofing and heat resistivity by being subjected to a curing treatment or a crystallization treatment. To put it concretely, after a film of an undercoat layer 6 is formed using a hydrophilic polymer water solution with a curing agent added, the film is subjected to a curing treatment by irradiation of light or heating, or an undercoat layer 6 without any curing agent is heated to be crystallized. For example, when the material of polyvinyl alcohol is used as a hydrophilic polymer, the polyvinyl alcohol is changed into a denaturalized polyvinyl alcohol.

Compared with the crystallization treatment, the curing treatment is desirable because the heating does not have adverse effects on the transparent substrate 1 and the curing treatment has better work efficiency. When curing treatment is required, any of the following concrete methods may be chosen.

1. Treatment of the dye surface by adding ammonium dichromate as a curing agent and simultaneous subjection of an undercoat layer 6 to curing reaction by irradiating with reacting light after the undercoat layer 6 having been made
2. Addition of an inorganic curing agent, for example, of copper, boron, aluminum, titanium, zirconium, tin, vanadium, chrome, and the like
3. Acetalization formation with aldehydes
4. Aldehyde formation of hydroxyl group
5. Addition of activated vinyl compound
6. Etherification with epoxide compound
7. Reaction of dicarboxylic acid with acid catalyst
8. Addition of succinic acid and sulfuric acid
9. Addition of triethylene glycol and methyl acrylate acid
10. Blending of polyacrylic acid and methyl vinyl ether-maleic acid copolymer With regard to materials of a transparent substrate 1, a data recording portion 3, a reflective layer 4, and a protective layer 5, the same material may be used in the first embodiment, and their explanation is omitted here to avoid repetition.

Various kinds of optical data recording media according to the second embodiment were produced using various dye materials as used in the first embodiment for a data recording portion and using various materials as used in the first embodiment for reflective layers. They were loaded in the drive system, used in the first embodiment, conforming to The CD Standard. When test data (random EMFsignals) were recorded on these media and reproduced therefrom, excellent recording and reproducing characteristics were obtained in the respective data recording optical media. The reflectivities of the reproducing light measured not less than 65%.

Third Embodiment

Figure 4:
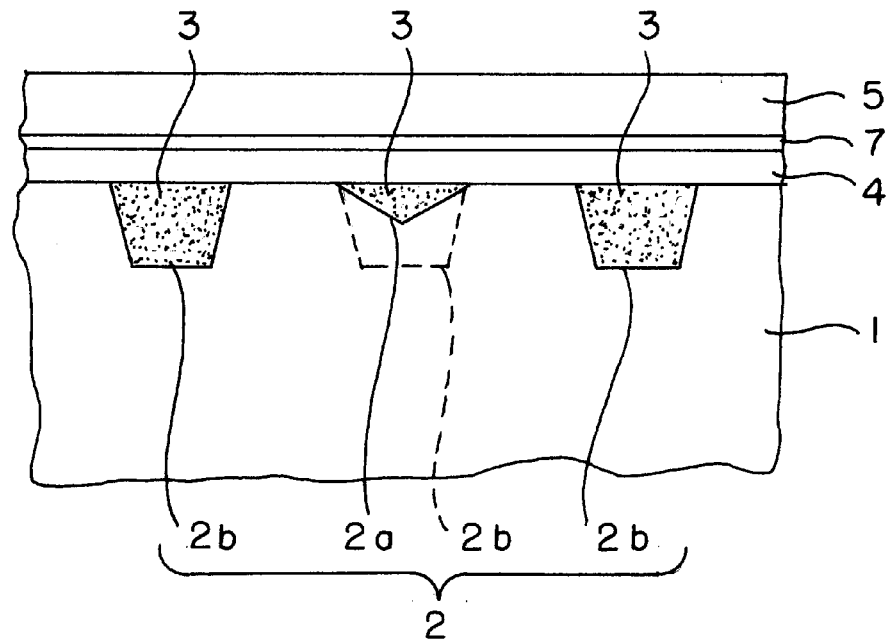
FIG. 4 is an enlarged cross sectional view of a main part of an optical data recording medium of the third embodiment according to the present invention.

An optical data recording medium according to a third embodiment will be explained based on FIG. 4. FIG. 4 is an enlarged cross sectional view of a main part of an optical data recording medium of the third embodiment. As clearly seen in the drawing, the optical data recording medium of the third embodiment is characterized in that a reflective layer 4 was laid through an intermediate layer 7 on the surface of a data recording portion 3 which was formed by filling a dye in a pre-formatted pattern and on the exposed surface between the neighboring data recording portions 3 of a transparent substrate 1. A protective layer 5 was coated on the reflective layer 4.

The intermediate layer 7 is formed to improve the adhesion of the data recording portion 3 to the reflective layer 4 and recording sensitivity, and to protect the data recording portion 3 using the same kind of hydrophilic resin as the undercoat layer 6 of the second embodiment. The method for forming the intermediate layer will be described by using FIG. 9. In FIG. 9, the steps S25–S28 show the process for forming the intermediate layer. A water solution of the hydrophilic resin such as polyvinylalcohol(PVA) is spin-coated on the land portion 2c of the transparent substrate and the data recording portion 3 which has been formed in the steps S21–S24, as described above, in FIG. 9 (S25). The spin-coated intermediate layer 7 is also desirable to be subjected to a curing treatment or a crystallization treatment in order to improve the water proofing and the heat resistivity (S26). The curing treatment and the crystallization treatment can be carried out by one of the methods described in the second embodiment. Then, in step S27, the transparent substrate 1 is annealed to evaporate water from the coated intermediate layer. Finally, residuals on the intermediate layer such as curing agent are removed by spin-coating water on the surface of the intermediate layer (S28).

With regard to materials and process for forming of a transparent substrate 1, a data recording portion 3, a reflective layer 4, and a protective layer 5, the same as those of the first embodiment may be used, and their explanation is omitted here to avoid repetition.

Various kinds of optical data recording media according to the third embodiment were produced using various dye materials as used in the first embodiment for a data recording portion and various material as used in the first embodiment for reflective layers. These obtained media were loaded in the drive system, used in the first embodiment, conforming to the CD Standard. When test data were recorded in the media and reproduced therefrom, excellent recording and reproducing characteristics were obtained in the respective media. The reflectivity of the reproducing light measured not less than 65%.

Further, when an undercoat layer as described in the second embodiment was formed on the surface having a pre-formatted pattern of the transparent substrate 1, and at the same time an intermediate layer 7 was formed on the surface of the data recording portion 3 and the undercoat layer exposed between the neighboring data recording portions, it was confirmed to have excellent recording and reproducing characteristics.

Fourth Embodiment

Figure 5:
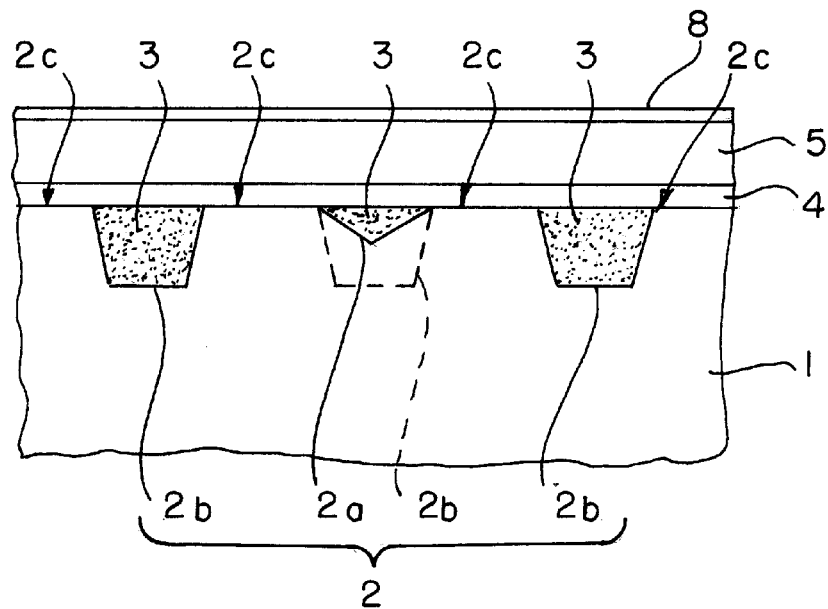
FIG. 5 is an enlarged cross sectional view of a main part of an optical data recording medium of the fourth embodiment according to the present invention.

An optical data recording medium according to a fourth embodiment is explained based on FIG. 5. FIG. 5 is an enlarged cross sectional view of a main part of an optical data recording medium according to the fourth embodiment. As clearly seen in the drawing, the optical data recording medium is characterized in that a printed layer 8 is applied on the surface of a protective layer 5.

The printed layer 8 may be formed using any conventional printing materials such as screen-printing materials. With regard to materials and process for forming of a transparent substrate 1, a data recording portion 3, a reflective layer 4, and a protective layer 5, the same as those of the first embodiment may be used, and their explanation is omitted here to avoid repetition.

These optical data recording media according to the fourth embodiment were loaded into the drive system conforming to the CD Standard, used in the first embodiment. When test data were recorded on the media and reproduced therefrom, excellent recording and reproducing characteristics were obtained. Further, although in this embodiment (FIG. 5) a printed layer was formed on the optical data recording medium according to the first embodiment (FIG. 1), the printed layer was formed on an optical data recording medium according to the second embodiment and the third embodiment respectively. In respective media with the printed layer, the same excellent performance in terms of recording and reproducing as those without the printed layer was obtained.

Fifth Embodiment

Figure 6:
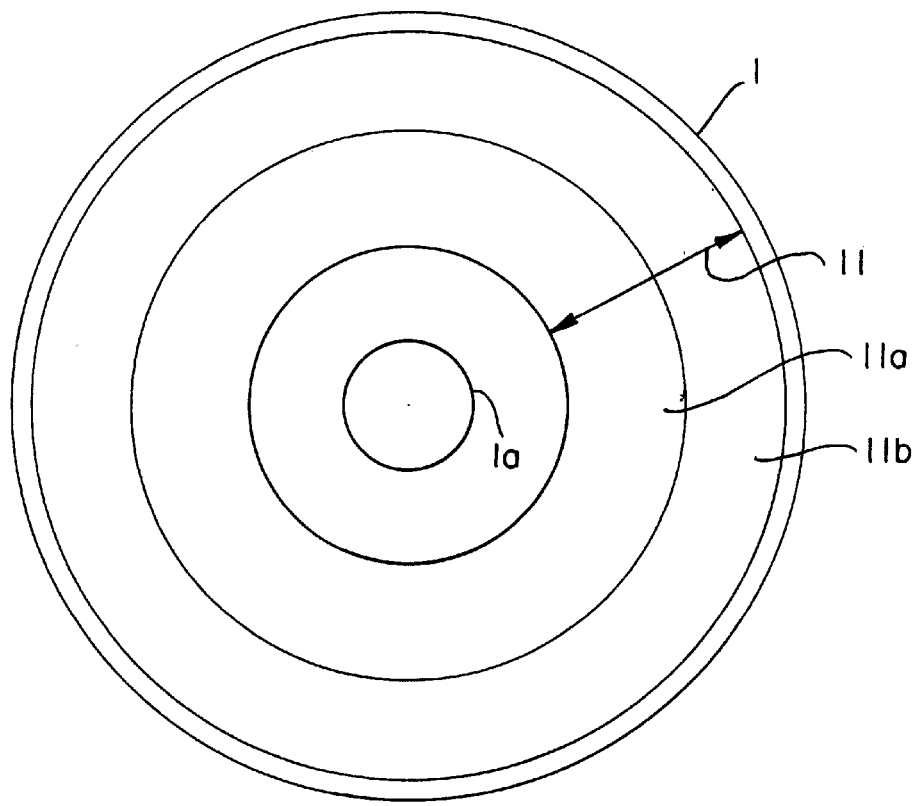
FIG. 6 is a top view of an optical data recording medium of the fifth embodiment according to the present invention.

An optical data recording medium according to a fifth embodiment is explained based on FIG. 6. FIG. 6 is a plan view of the optical recording medium according to the fifth embodiment. As clearly seen in the drawing, the optical recording medium according to the present embodiment is characterized by an optical data recording medium having a data recording area divided into a ROM area 11a and a writable area 11b, or a so-called partial ROM type optical data recording medium to which the present invention is applied.

A pre-formatted pattern composed of read-only data signals with a beam guiding portion and a header portion in the form of pre-pit is formed in the ROM area 11a. On the other hand, a pre-formatted pattern composed of a beam guiding portion and a header portion only is formed in the writable area, and an unrecorded portion between the header portions arranged at a certain distance is defined as a writable area for data.

Further, the writable area 11b can be constructed in the same way as the optical data recording medium according to the first embodiment, the second embodiment, or the third embodiment. Also, a printed layer can be formed on the outside surface of a protective layer as shown in FIG. 5.

With regard to materials and process for forming of a transparent substrate 1, a data recording portion 3, a reflective layer 4, and a protective layer 5, the same as those of the first embodiment may be used, and their explanation is omitted here to avoid repetition.

The writable area 11b of the optical data recording medium according to the fifth embodiment was confirmed to have the same excellent recording and reproducing characteristics as the above-mentioned embodiments. Further, the ROM area 11a was confirmed to have excellent reproducing characteristics when used on a drive system conforming to the CD Standard.

Sixth Embodiment

Figure 7:
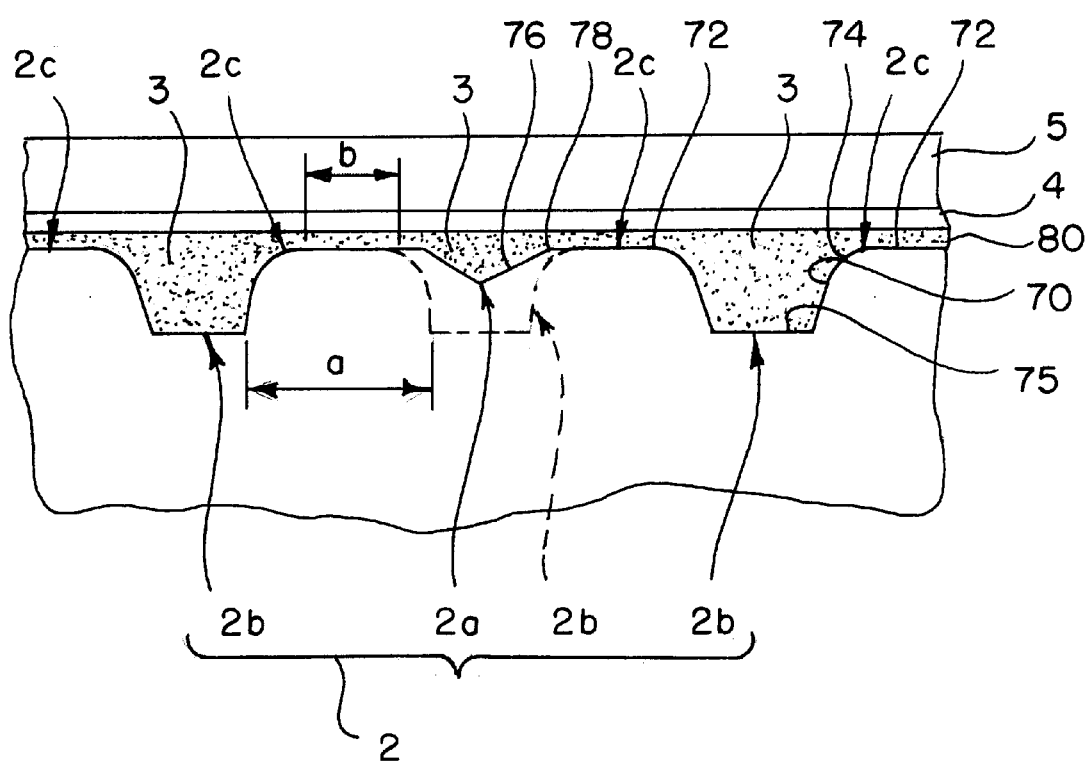
FIG. 7 is an enlarged cross sectional view of a main part of an optical data recording medium of the sixth embodiment according to the present invention.
Figure 8:
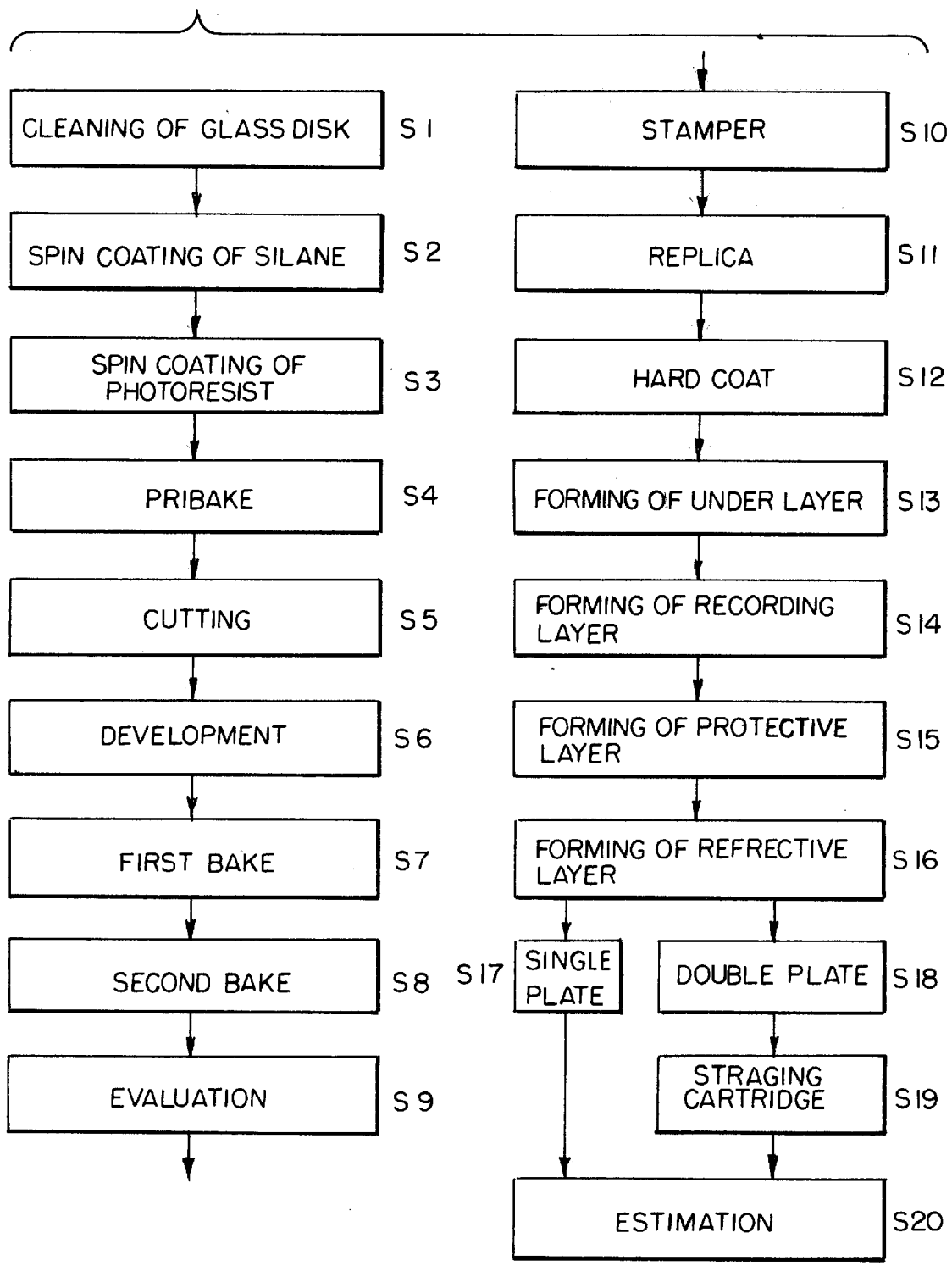
FIG. 8 is a flowchart showing the manufacturing processes of an optical data recording medium of the sixth embodiment according to the present invention.

An optical data recording medium according to a sixth embodiment is explained based on FIG. 7 through FIG. 8. FIG. 7 is a cross sectional view of the optical data recording medium according to the sixth embodiment, and FIG. 8 is a flowchart of manufacturing processes for the optical recording medium according to the sixth embodiment. As shown in FIG. 7, the optical data recording medium according to the sixth embodiment is characterized in that a side wall 76 of a groove 2a and a side wall 70 of a pre-pit 2b are connected with a land surface 72 of land area 2c by a curved surfaces 78 and 74 respectively.

As shown in FIG. 1, FIG. 3, FIG. 4, and FIG. 5, the optical data recording medium according to the first through the fifth embodiment has a boundary between the guide groove 2a and the land area 2c and a boundary between the pre-pit 2b and the land area 2c both of which are sharp-edged. However, the optical data recording medium according to the sixth embodiment is structured so that each boundary has a curved surface as shown in FIG. 7 in order to decrease interference between the light reflected from the land surface and the bottom 75. In accordance with the structure of the pre-formatted pattern where the side walls of recesses like grooves 2a and pre-pits 2b are connected with the respective land surfaces by curved surfaces, a reflectivity of not less than 65% with laser beam for reproduction can be easily obtained. Further, in this embodiment, the dye material was filled not only in the recesses including the groove 2a and the pre-pit 2b, but also placed as a thin data recording layer 80 between the substrate 1 and reflective layer 4. However, the structure of the optical recording media described in the first to fifth embodiments where the dye material existed only in the recesses of the pre-formatted pattern may be applied to the present embodiment as shown in FIG. 7.

As a ratio b/a of a width b of the land area 2c to a distance a between the neighboring bottom surfaces 75 of two lines in the pre-formatted pattern becomes smaller, it is desirable to obtain more sufficient reflectivity. However, when the ratio is 95% or less, it is sufficient.

The manufacturing processes of the optical data recording medium according to the sixth embodiment is shown in the flowchart of FIG. 8.

In the first stage (S1), a glass disk is cleaned by an appropriate solvent or other method. Then, a silane solution as an adhesive accelerator and a photoresist are spin-coated respectively on the glass disk (S2,S3). In the fourth stage (S4), the glass disk is prebaked and then the glass disk with photoresist is exposed to a laser beam in accordance with a certain pre-formatted pattern thereon (S5:cutting). After developing the exposed glass disk (S6), it is subjected to the first bake treatment (S7) which is one process used in a conventional technique for manufacturing the transparent substrate. Then, in the second bake treatment (S8), the grass disk is heated over the glass transition temperature of the photo-resist to deform the pre-formatted pattern developed in the stage S6. This deformation by the heating provides the specific structure of the photoresist where a boundary between the guide groove 2a and the land area 2c and a boundary between the pre-pit 2b and the land area 2c are in the form of curved surfaces. After this stage (S8), the conventional processes as shown in FIG. 8 (steps S9–S20) are carried out for making an optical data recording medium The optical data recording medium according to the sixth embodiment with the boundary between the guide groove 2a and the land area 2c and the boundary between the pre-pit 2b and the land area 2c both of which have a curved surface can reduce the interference of light at the boundary between the bottom surface of the pre-formatted pattern 2 and the land area 2c of the transparent substrate 1 compared with the boundaries of a sharp edge. Consequently, even if the material having a less reflectivity than pure silver are used to form a reflective layer 4, the reflectivity of not less than 65%.

Seventh Embodiment

Figure 10:
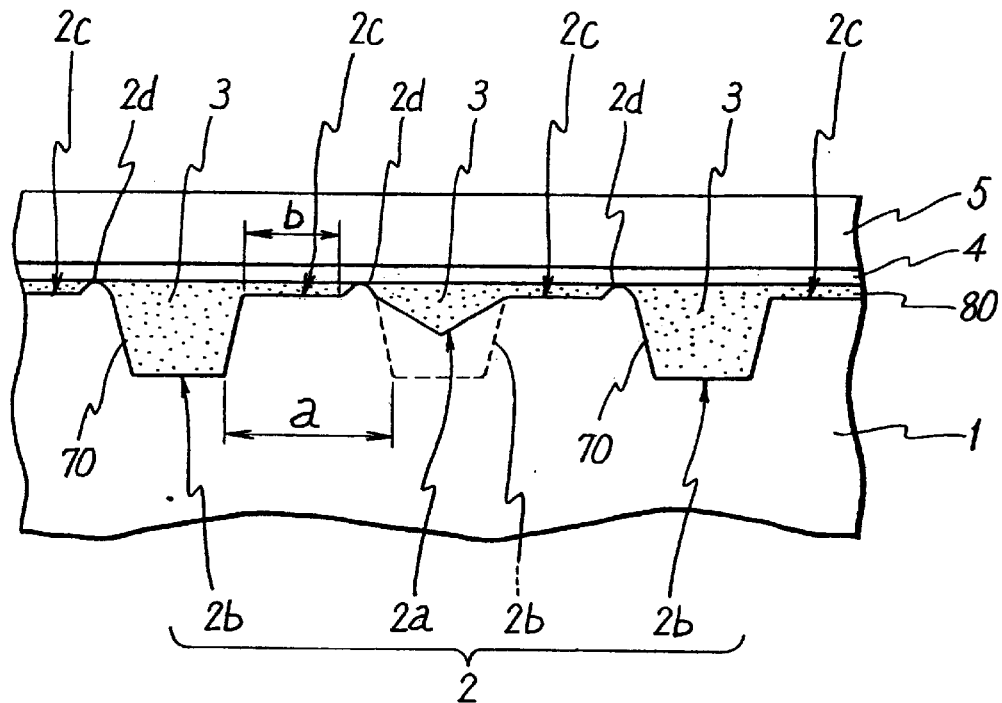
FIG. 10 is an enlarged cross sectional view of a main part of an optical data recording medium of the seventh embodiment according to the present invention.
Figure 11:
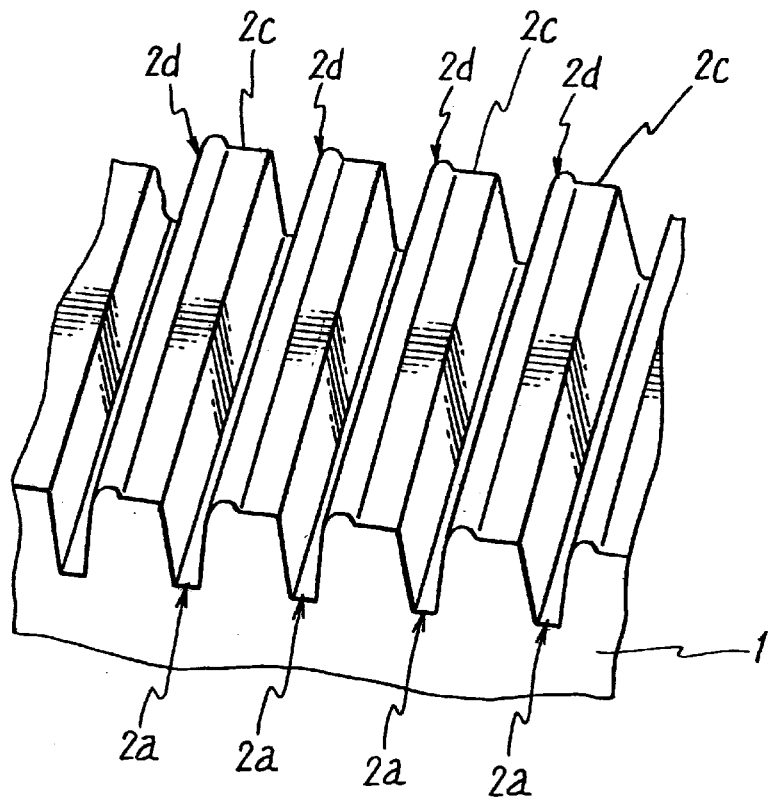
FIG. 11 is an enlarged perspective view of the data recording medium of the seventh embodiment of the present invention which shows the conceptional structure of the guide groove and the projecting portion from the land surface.

An optical data recording medium according to a seventh embodiment is explained based on FIGS. 10 and 11. FIG. 10 is a cross sectional view of a main part of the optical data recording medium according to the seventh embodiment. As shown in FIG. 10, the optical data recording medium is characterized in that a portion 2d corresponding to one edge (left side edge in FIG. 10) of the land area 2c is projected from the land surface in the thickness direction of the transparent substrate. The portion 2d also corresponds to a boundary between the side wall 70 (left side wall in FIG. 10) of the pre-pit 2b and a surface of the land area 2c formed.

FIG. 11 is a conceptional view showing the structure of the guide groove 2a and the projecting portion 2d of the optical data recording medium according to the seventh embodiment. In FIG. 11, the pre-pits 2b and the dye material 3 are not shown for the purpose of simply explaining the structural relationship between the projecting portion 2d and the guide groove 2a. The projecting portion 2d is formed on the left side edge of the land portion 2c and extends linearly along the groove 2a.

Although, as shown in FIG. 1, FIG. 3, FIG. 4, and FIG. 5, the optical data recording media according to the first through the fifth embodiments have a flat surface of the land portion 2c, the optical data recording medium according to the seventh embodiment has the linear projected portion 2d from the land surface in the direction of the thickness of the transparent substrate 1 at the boundary between the recess (groove 2a, pre-pit 2b) and the land portion 2c. Also, in the case of the seventh embodiment, it is preferred that the ratio b/a of a width b of the land area (without the area of the projecting portion 2d) to a distance a between the bottoms of neighboring pre-pits 2b in the pre-formatted pattern is not more than 90%.

The linear projected portion 2d can be formed by opening the molding die and removing the transparent substrate from the stamper in the step S11 shown in FIG. 8 after the resin was injected into the die with the stamper therein, but before the resin has been completely hardened. The other steps for manufacturing the optical recording medium according to the present embodiment has the same steps shown in the sixth embodiment and FIG. 8 except the step of the second bake (S8) was not carried out.

The optical data recording medium according to the present embodiment has the linear projected portion in the thickness direction of the transparent substrate formed at the boundary between the recesses of pre-formatted pattern 2 and the land area 2c, and the interference of light is reduced at the boundary. Consequently, even if the reflective materials having less reflectivity than pure silver is used to form a reflective layer 4, the reflectivity of more than 65% can be obtained.

Further, the above-mentioned embodiments were explained using disk-like recording media, but the essential points of the present invention is not limited only to the disk-like recording media, but can be applied to optical data recording media of other forms such as card-like or tape-like media.

As mentioned above, as the present invention enables the production of an optical data recording medium such as writable CDs requiring, for example, a reflectivity of more than 65% using low-cost materials like aluminum for the reflective layer, the production cost of such optical data recording can be reduced. Further, as the manufacturing method of an optical data recording medium according to the present invention enables the production of writable optical data recording media of a high reflectivity provided with a low-cost and corrosion resisting reflective layer composed of aluminum and the like, such optical data recording media can be produced at a low cost.

Although the reproduction light of the wavelength $\lambda=650$ nm was used in Examples 1-(9)~1-(12) of the first Embodiment, an wavelength selected from the range of 630~670 nm may be used instead of $\lambda=650$ nm to reproduce the optical recording media obtained in these Examples.

What is claimed is:

1. An optical data recording medium comprising:
   a transparent substrate formed by molding such that recesses and lands are formed on one surface of the substrate as a pre-formatted pattern and a portion connecting a side wall of a recess with a land surface defined by the recess is formed as a curved surface;
   a data recording layer comprised of a dye material and formed on the one surface of the transparent substrate and;
   a reflective layer comprised of a material having a lower reflectivity than silver and formed on the data recording layer, wherein the data recording layer exists only in the recesses of the transparent substrate.

2. An optical data recording medium according to claim 1, wherein a ratio b/a of a width b of the land surface defined between neighboring recesses to a distance a between the bottoms of the neighboring recesses is not more than 0.9.

3. An optical data recording medium according to claim 1, wherein the optical data recording medium has a reflectivity of more than 65% with a laser beam for reproduction.

4. An optical data recording medium according to claim 1, wherein the material of the reflective layer is one material selected from a group consisting of aluminum, copper and a polymer material produced by association of a dicarbocyanine dye dispersed vinyl resin solution.

5. An optical data recording medium according to claim 1, wherein the material of the reflective layer is aluminum.

6. An optical data recording medium comprising:
   a transparent substrate formed by molding such that recesses and lands are formed as a pre-formatted pattern and a portion connecting a side wall of a recess with a land surface defined by the recess is projected from the land surface in a direction of the thickness of the transparent substrate;
   a data recording layer comprised of a dye material and formed on the one surface of the transparent substrate and;
   a reflective layer comprised of a material having a lower reflectivity than silver and formed on the data recording layer,
   wherein the data recording layer exists only in the recesses of the transparent substrate.

7. An optical data recording medium according to claim 6, wherein a ratio b/a of a width b of the land defined between neighboring recesses to a distance between the bottoms of the neighboring recesses is not more than 0.9.

8. An optical data recording medium according to claim 6, wherein the optical data recording medium has a reflectivity of more than 65% with a laser beam for reproduction.

9. An optical data recording medium according to claim 6, wherein the material of the reflective layer is one material selected from a group consisting of aluminum, copper and a polymer material produced by association of a dicarbocyanine dye dispersed vinyl resin solution.

10. An optical data recording medium according to claim 6, wherein the material of the reflective layer is aluminum.

11. An optical data recording medium comprising:
    a transparent substrate on one surface of which recesses and lands are formed as pre-formatted pattern;
    a reflective layer comprised of a material having a lower reflectivity than silver and formed on the one surface of the transparent substrate;
    a data recording portion comprising a dye material, which is formed only in the recesses of the transparent substrate.

12. An optical data recording medium according to claim 11, wherein the optical data recording medium has a reflectivity of more than 65% with a laser beam for reproduction.

13. An optical data recording medium according to claim 11, wherein the material of the reflective layer is one material selected from a group consisting of aluminum, copper and a polymer material produced by association of a dicarbocyanine dye dispersed vinyl resin solution.

14. An optical data recording medium according to claim 11, wherein the material of the reflective layer is aluminum.

15. An optical data recording medium according to claim 11, wherein the dye material is at least one materials selected from a group consisting of dicarbocyanine derivative, a phthalocyanine derivative, a naphthalocyanine derivative, and a cyanine derivative.

16. An optical data recording medium according to claim 11, wherein the transparent substrate is a substrate formed by molding such that a portion connecting a side wall of a recess with a land surface defined by the recess is formed as a curved surface.

17. An optical data recording medium according to claim 11, wherein the transparent substrate is a substrate formed by molding such that a portion connecting a side wall of a recess with a land surface defined by the recess is projected from the land surface in a direction of the thickness of the transparent substrate.

18. A method for manufacturing an optical data recording medium comprising:

preparing a transparent substrate on one surface of which recesses and lands are formed as a pre-formatted pattern;

placing a dye material only in the recesses of the transparent substrate;

forming a reflective layer on the dye material filled in the recesses and the lands of the transparent substrate.

19. A method for manufacturing an optical data recording medium according to claim 18, wherein the dye material is filled only in the recesses by spin-coating a solution of the dye material on the one surface of the transparent substrate and selectively removing the dye material deposited on the lands between the recesses so as to expose the surface of the lands.

20. A method for manufacturing an optical data recording medium according to claim 19, wherein the dye material deposited on the lands is selectively removed by spin-coating a solvent on the one surface after spin-coating of the solution of the dye material.

* * * * *